United States Patent
Fukumoto et al.

(10) Patent No.: US 11,435,721 B2
(45) Date of Patent: Sep. 6, 2022

(54) PARAMETER SETTING DEVICE AND PARAMETER SETTING SYSTEM FOR MACHINE TOOL

(71) Applicant: FANUC CORPORATION, Yamanashi (JP)

(72) Inventors: Akinobu Fukumoto, Yamanashi (JP); Tooru Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/029,039

(22) Filed: Sep. 23, 2020

(65) Prior Publication Data
US 2021/0109498 A1 Apr. 15, 2021

(30) Foreign Application Priority Data
Oct. 11, 2019 (JP) .............................. JP2019-187369

(51) Int. Cl.
 G05B 19/408 (2006.01)
 G05B 19/409 (2006.01)
 G05B 19/042 (2006.01)
(52) U.S. Cl.
 CPC ..... *G05B 19/4083* (2013.01); *G05B 19/0426* (2013.01); *G05B 19/409* (2013.01); *G05B 2219/31103* (2013.01); *G05B 2219/33119* (2013.01); *G05B 2219/33125* (2013.01)

(58) Field of Classification Search
 CPC .............. G05B 19/4083; G05B 19/409; G05B 19/0426; G05B 2219/31103; G05B 2219/33125; G05B 2219/33119; G05B 2219/49087; B23Q 15/00
 See application file for complete search history.

(56) References Cited

U.S. PATENT DOCUMENTS

| | | | |
|---|---|---|---|
| 2002/0049512 A1* | 4/2002 | Mizuno .............. | G05B 19/4185 700/169 |
| 2006/0253838 A1* | 11/2006 | Fujii ................... | G06F 9/44505 717/124 |
| 2011/0087364 A1* | 4/2011 | Gray .................. | G05B 19/4061 700/186 |
| 2017/0300036 A1 | 10/2017 | Maeda et al. | |
| 2020/0379438 A1* | 12/2020 | Kato .................... | G05B 19/414 |

FOREIGN PATENT DOCUMENTS

JP 2017191541 A 10/2017

* cited by examiner

*Primary Examiner* — Christopher E. Everett
(74) *Attorney, Agent, or Firm* — Hauptman Ham, LLP

(57) ABSTRACT

A personal computer for setting of parameters of a machine tool acquires adjusted parameters, adjusted by a numerical controller or a simulator, from the numerical controller or the simulator, makes a comparison between an axis configuration of the machine tool set up by a user and an axis configuration of the adjusted parameter adjusted by the numerical controller or the simulator, and converts the axis configuration of the adjusted parameters into the axis configuration set up by the user.

12 Claims, 9 Drawing Sheets

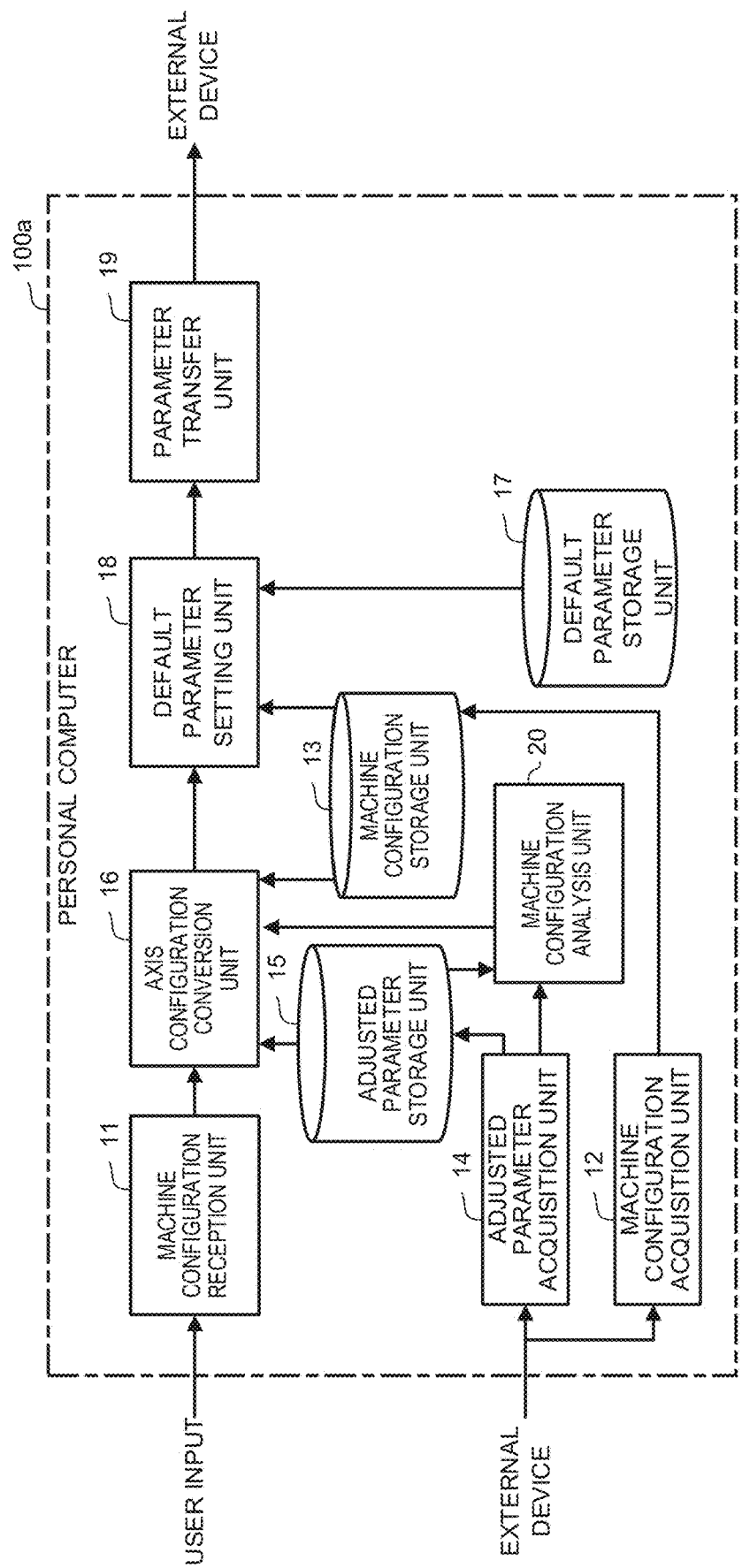

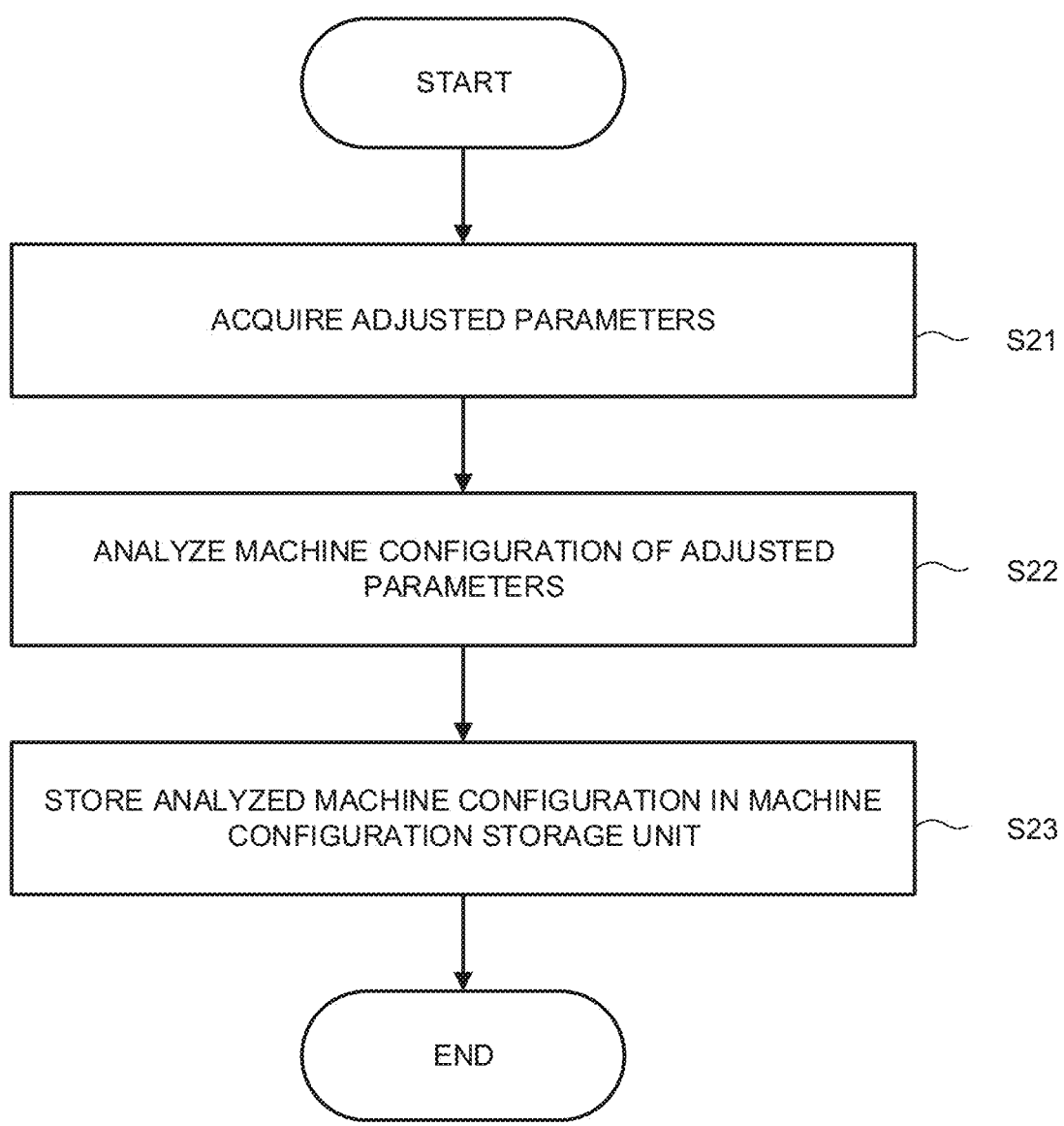

PARAMETER SETTING DEVICE AND PARAMETER SETTING SYSTEM FOR MACHINE TOOL

RELATED APPLICATIONS

The present application claims priority to Japanese Patent Application Number 2019-187369 filed Oct. 11, 2019, the disclosure of which is hereby incorporated by reference herein in its entirety.

BACKGROUND OF THE INVENTION

1. Field of the Invention

The present invention relates to a parameter setting device and a parameter setting system for a numerical controlled machine tool.

2. Description of the Related Art

For setting of a numerical controlled machine tool, an enormous number of CNC parameters have to be set up. In order to reduce a burden of such troublesome operation, conventionally, there has been software for generation of default parameters. Such software is generally implemented in a personal computer. When a user sets up a machine configuration of a machine tool, the software automatically generates default parameters, although the parameters include only minimal required parameters. The parameters that are generated when the machine configuration is set up are referred to as machine configuration parameters. The machine configuration parameters include identification information on the machine, relation between axes of a numerical controller (first axis, second axis, . . . ) and axes of the machine tool (X axis, Y axis, . . . ), identification information on motors mounted on the axes, types of the axes (straight axis, rotation axis, and the like), and the like.

To aid the parameter setting, some software have a function to generate the default parameters based on the machine configuration parameters set by the user (see Japanese Patent Application Laid-Open No. 2017-191541, for instance). The default parameters, however, are unfinished and have to be adjusted for the use of actual equipment, a simulator, or the like. Conventionally, the user manually sets up each parameter manually.

The user sets up not only machine configuration but also axis configuration of a machine tool. In setting of the axis configuration, addition of an axis may be made, such as adding fifth axis subsequent to initial operation with four axes. Before the addition of the axis, the parameters for the first to fourth axes have been already adjusted. However, the default parameters are newly generated based on a new axis configuration thus the existing adjusted parameters are not reflected.

SUMMARY OF THE INVENTION

In a field of numerical controlled machine tool, a technique for effective use of adjusted parameters is demanded.

A parameter setting device according to an aspect of the present disclosure is a parameter setting device for a machine tool having a plurality of axes. The parameter setting device includes: a machine configuration reception unit that receives settings of a machine configuration of the machine tool which includes an axis configuration of the plurality of axes; an adjusted parameter acquisition unit that acquires adjusted parameters which have been adjusted so as to adapt to actual motions of the machine tool; and an axis configuration conversion unit that detects a difference between the axis configuration of the machine configuration set up in the machine configuration reception unit and the axis configuration of the adjusted parameters and that makes a conversion of the axis configuration of the adjusted parameters into the axis configuration of the machine configuration set up in the machine configuration reception unit.

A parameter setting system according to another aspect of the present disclosure is a parameter setting system for a machine tool having a plurality of axes. The parameter setting system includes: a machine configuration reception unit that receives settings of a machine configuration of the machine tool which includes an axis configuration of the plurality of axes; an adjusted parameter acquisition unit that acquires adjusted parameters which have been adjusted so as to adapt to actual motions of the machine tool; and an axis configuration conversion unit that detects a difference between the axis configuration of the machine configuration set up in the machine configuration reception unit and the axis configuration of the adjusted parameters and that makes a conversion of the axis configuration of the adjusted parameters into the axis configuration of the machine configuration set up in the machine configuration reception unit.

A parameter setting method according to still another aspect of the present disclosure is a parameter setting method for a machine tool having a plurality of axes. The parameter setting method includes: receiving settings by a user of a machine configuration of the machine tool which includes an axis configuration of the plurality of axes; acquiring adjusted parameters which have been adjusted so as to adapt to actual motions of the machine tool; and detecting a difference between the axis configuration of the machine configuration set up by the user and the axis configuration of the adjusted parameters and making a conversion of the axis configuration of the adjusted parameters into the axis configuration of the machine configuration set up by the user.

BRIEF DESCRIPTION OF THE DRAWINGS

FIG. 8 is a block diagram for a personal computer according to another embodiment.

FIG. 9 is a flowchart illustrating operation of a machine configuration analysis unit.

DETAILED DESCRIPTION OF THE PREFERRED EMBODIMENTS

Figure 1:
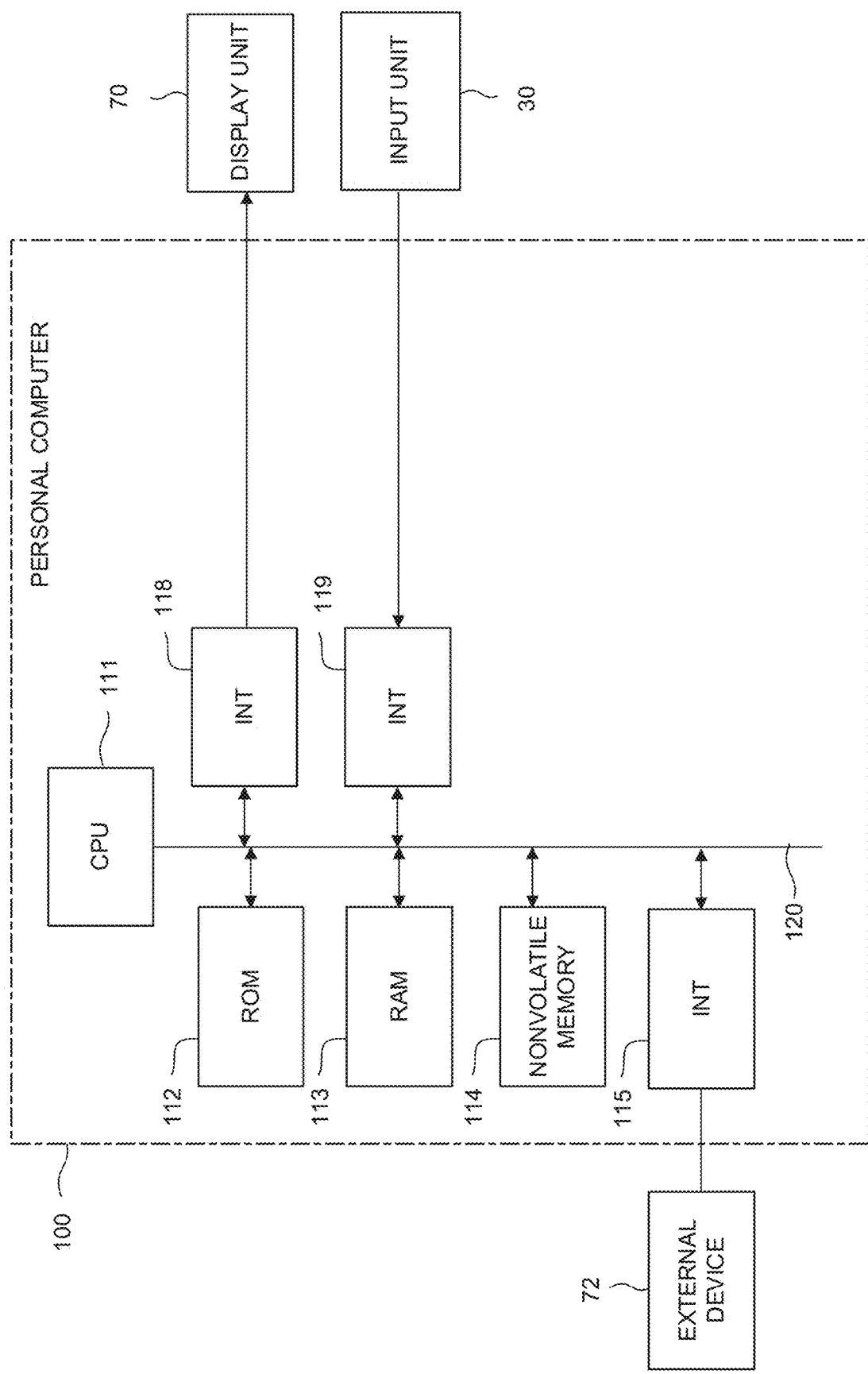
FIG. 1 is a hardware configuration diagram of a personal computer according to an embodiment.

Hereinbelow, an embodiment in which an axis setting device of the present disclosure is installed in a personal computer will be described. FIG. 1 is a hardware configuration diagram of the personal computer according to the embodiment.

A personal computer 100 includes a CPU 111, a ROM 112, a RAM 113, a nonvolatile memory 114, interfaces (INT) 115, 118, 119, a display unit 70, and an input unit 30.

The CPU 111 is a processor that controls the personal computer 100 as a whole. The CPU 111 reads out system programs stored in the ROM 112 through a bus 120 and controls the whole personal computer 100 in accordance with the system programs. Temporary calculation data and display data, various types of data inputted by an operator through the input unit 30, and the like are temporarily stored in the RAM 113.

The nonvolatile memory 114 is configured as a memory which is backed up by a battery not illustrated or the like, for instance, so that storage status thereof is retained even if the personal computer 100 is powered off. In the nonvolatile memory 114, programs read in from an external device 72 through the interface 115, programs inputted through the input unit 30, and various types of data (such as setting parameters acquired from a machine tool) acquired from units of the personal computer 100, the machine tool, and the like are stored. The programs and the various types of data that are stored in the nonvolatile memory 114 may be expanded in the RAM 113 for execution/use. A parameter setting program according to the present disclosure and system programs have been written into the ROM 112.

The interface 115 is an interface intended for making a connection between the personal computer 100 and the external device 72 such as an adapter. From a side of the external device 72, programs, various types of parameters, and the like are read in. The various types of parameters and the like edited in the personal computer 100 may be stored in an external storage through the external device 72. The parameter setting program according to the present disclosure may be stored in one external storage or a plurality of external storages, instead of the ROM 112 in the personal computer 100, and may be read in from the externals.

On the display unit 70, data read onto the RAM 113, data obtained as a result of execution of a program or the like, is outputted through the interface 118 so as to be displayed. The input unit 30 made of a keyboard, a mouse, or the like passes input by a user through the interface 119 to the CPU 111.

Figure 2:
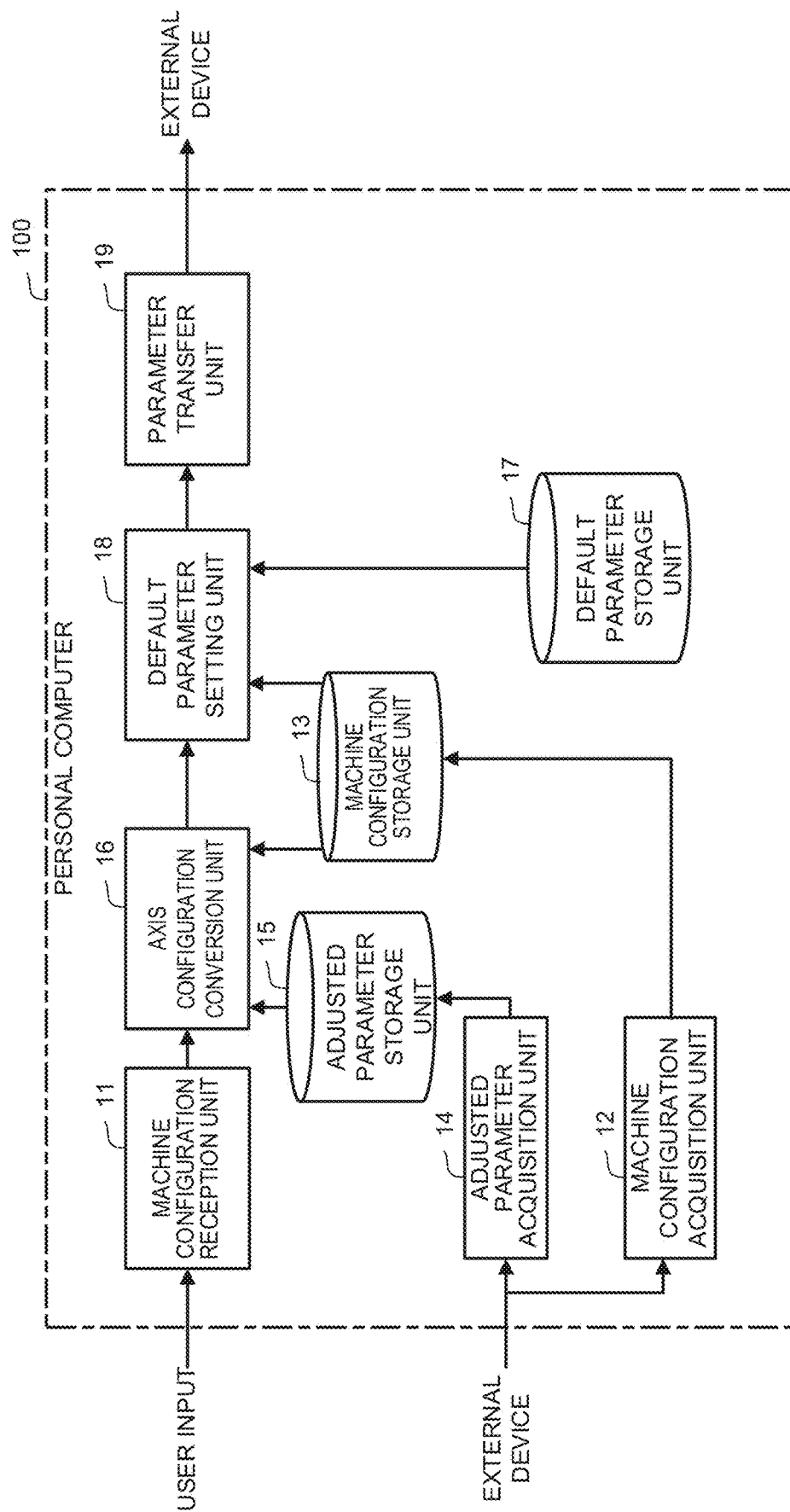
FIG. 2 is a block diagram for the personal computer according to the embodiment.

FIG. 2 is a block diagram depicting main parts of the personal computer 100 that is the embodiment of the present disclosure. A configuration below is implemented by the CPU 111 executing the parameter setting program in the ROM 112.

The personal computer 100 includes: a machine configuration reception unit 11 that receives a machine configuration set by the user; a machine configuration acquisition unit 12 that acquires machine configurations set up before; a machine configuration storage unit 13 that stores the machine configurations set up before; an adjusted parameter acquisition unit 14 that acquires parameters adjusted for an actual machine or a simulator; an adjusted parameter storage unit 15 that stores the adjusted parameters; an axis configuration conversion unit 16 that reads out the adjusted parameters related to machine configuration and convert the axis configuration of the adjusted parameters when the machine configuration identical or similar to the machine configuration set by the user through the machine configuration reception unit 11; a default parameter storage unit 17 that stores default parameters; a default parameter setting unit 18 that sets up the default parameters; and a parameter transfer unit 19 that transfers the parameters, generated by the personal computer 100 of the present disclosure, to the external device.

These functions of the personal computer 100 are implemented by the CPU 111 executing programs stored in the ROM 112 or read through the interface 115. The functions may also be implemented by a server connected through the interface 115.

The machine configuration reception unit 11 causes the display unit 70 of the personal computer 100 to display a machine configuration edit screen. On the machine configuration edit screen, a machine configuration may be set up. The machine configuration includes identification information on a machine tool, correspondence relation of axis that defines which axis of a numerical controller (first axis, second axis, . . . ) corresponds to which axis of the machine tool (X axis, Y axis, . . . ), identification information on motors mounted on the axes, types of the axes (straight axis, rotation axis), and the like.

The machine configuration acquisition unit 12 acquires a machine configuration from a numerical controller. The machine configuration can be acquired from another personal computer connected to the personal computer 100, a portable storage medium inserted in the personal computer 100, or the like.

The machine configuration storage unit 13 stores the machine configuration. The machine configuration storage unit 13 stores a machine configuration that has been set up and adjusts for the machine. The machine configurations are not limited to those set up by the user in the machine configuration reception unit 11. The machine configurations may be acquired via the machine configuration acquisition unit 12 from external devices such as a personal computer, a numerical controller, or a portable storage medium. Data format of the machine configurations parameters is the same as that of the machine tool parameters. Therefore, the machine configurations parameters may be treated in the same manner as other parameters of the machine tool is.

The adjusted parameter storage unit 15 stores the adjusted parameters acquired from a numerical controller or a simulator. The adjusted parameters are not the default parameters. The adjusted parameters have been adjusted on the numerical controller or the simulator so that the parameters adapt to the machine tool.

The axis configuration conversion unit 16 converts the axis configuration of the adjusted parameters. Adjusted parameters that are to undergo the conversion of the axis configuration may be directly specified by the user or may be searched for by the axis configuration conversion unit 16. When searching for adjusted parameters, the axis configuration conversion unit 16 searches for the adjusted parameters having the axis configuration identical or similar to the machine configuration set up by the user through the machine configuration reception unit 11. The axis configuration conversion unit 16 detects a difference in the axis configuration and thereafter makes the conversion of the axis configuration. Specifically, the axis configuration conversion unit 16 moves or copies the parameters set up for the axes. The axis configuration conversion unit 16 also converts inter-axis relations, in case where the inter-axis relations are specified by the parameters.

The default parameter storage unit 17 stores the default parameters corresponding to the machine configurations. The default parameters are unadjusted and are minimal required parameters for movement of the axes.

In case where a new axis that has not been set up in the past is added, the default parameter setting unit 18 reads out default parameters from the default parameter storage unit 17 based on the machine configuration set up by the user and sets the default parameters as the parameters for the added axis.

The parameter transfer unit 19 transfers the parameters set up by the axis configuration conversion unit 16 and the default parameter setting unit 18 to an external device such as a numerical controller, another personal computer, a portable storage medium, or the like. The parameters transferred by the parameter transfer unit 19 are used for operation of the machine tool by the numerical controller, a simulation, or the like. Transferred parameters are adjusted for the Consequently, adjustment of the parameters is made and the adjusted parameters are finished.

With reference to FIGS. 3 to 7, subsequently, a parameter setting process in the personal computer 100 will be described. In a description below, (1) case where a machine configuration to be reused is specified by the user and (2) case where a machine configuration that may be reused is searched for on a side of the personal computer 100 will be described.

Figure 3:
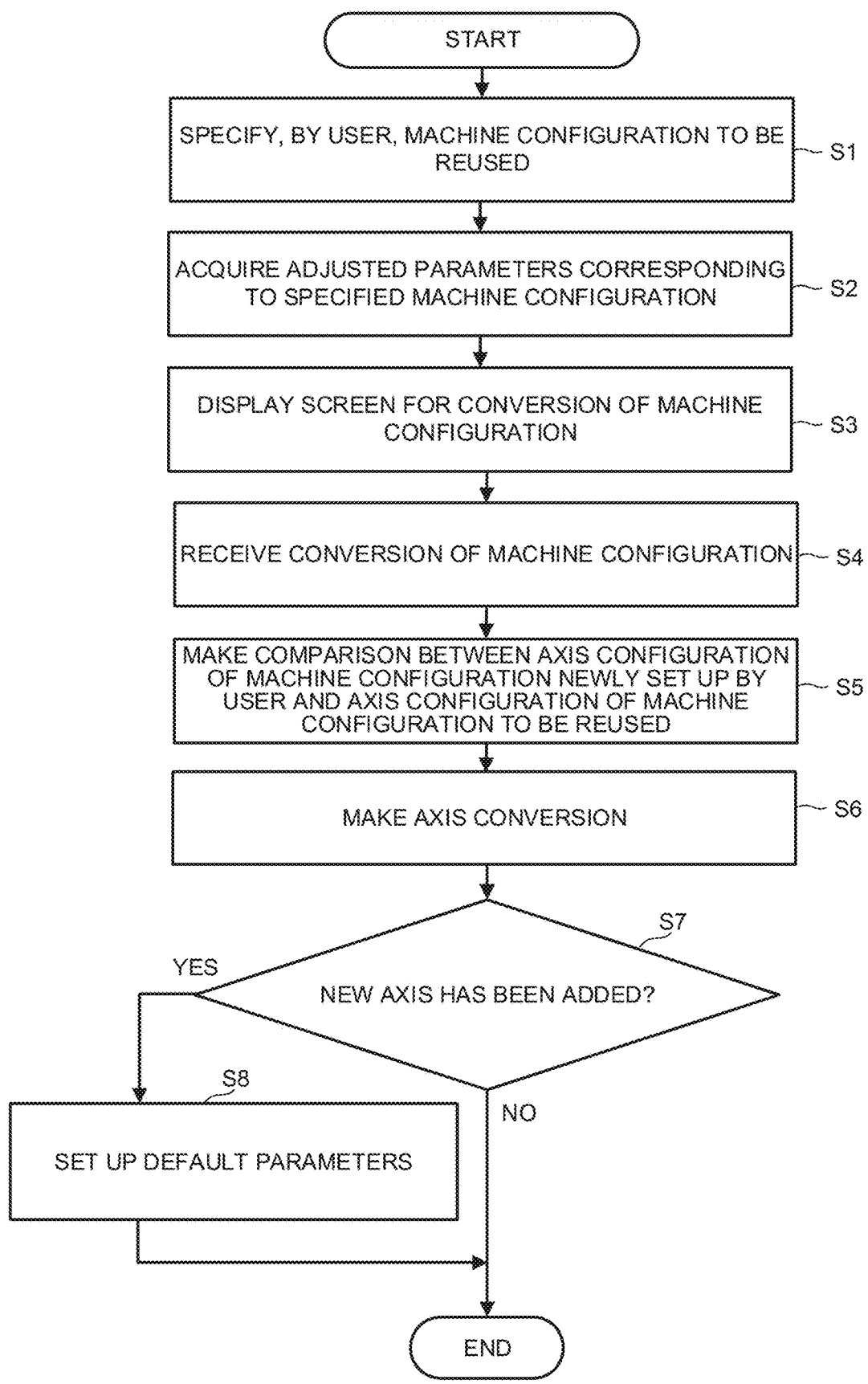
FIG. 3 is a flowchart illustrating operation of the personal computer in case where a user specifies adjusted parameters to be reused.
Figure 4:
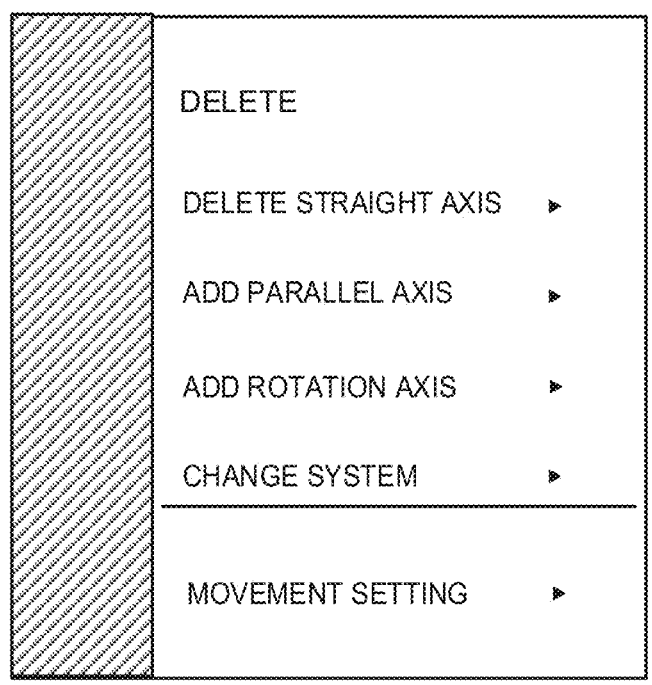
FIG. 4 is an example of a screen for conversion of an axis configuration.

(1) Operation of the personal computer 100 in case where the machine configuration to be reused is specified by the user will be described with reference to FIG. 3. Once the machine configuration to be reused is specified by the user (step S1), the adjusted parameter acquisition unit 14 acquires the adjusted parameters corresponding to the machine configuration specified by the user (step S2). Then a screen for the conversion of the machine configuration of the adjusted parameters as illustrated in FIG. 4, for instance, is displayed along with the adjusted parameters on the display unit 70 (step S3). In this example of the screen, the user may set up such items as addition and deletion of straight axis, addition and deletion of parallel axis, addition and deletion of rotation axis, and movement setting. The user carries out the addition or movement of the axes, or the like, while performing manipulation on the screen, and thereby makes the conversion of the existing machine configuration (step S4).

The axis configuration conversion unit 16 makes a comparison between an axis configuration of the machine configuration set up in step S4 and an axis configuration of the adjusted parameters acquired in step S2 (step S5). The axis configuration conversion unit 16 makes an axis conversion such as the copying and movement of the axes of the adjusted parameters or the conversion of the inter-axis relations in accordance with a result of the comparison in step S5 (step S6). In case where a new axis that is not set up in the adjusted parameters has been added as a result of the comparison between the axis configurations in step S5 (step S7; YES), the default parameters of the added axis are read out from the default parameter storage unit 17 and are set up based on the machine configuration set up by the user in step S4 (step S8). In case where any new axis has not been added as the result of the comparison between the axis configurations in step S5 (step S7; NO), the setting of the parameters is ended. The parameter transfer unit 19 transfers the parameters of the machine tool set up in this manner to such an external device as the numerical controller or another personal computer, a portable storage medium, or the like. The parameters transferred by the parameter transfer unit 19 are adjusted for the numerical controller or the simulator.

Figure 5:
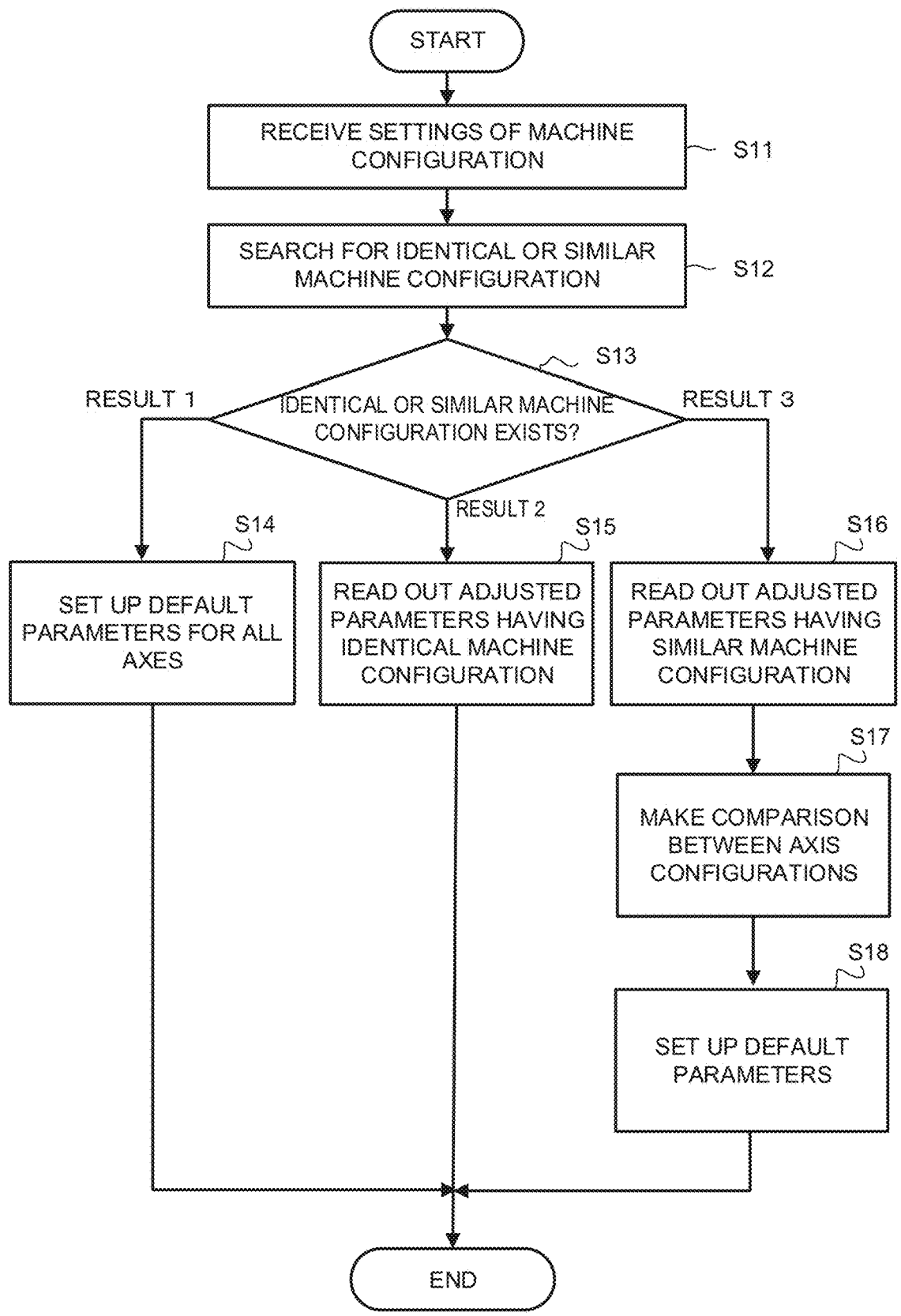
FIG. 5 is a flowchart illustrating operation of the personal computer searching for the adjusted parameters.

(2) An example where the personal computer 100 searches for adjusted parameters that may be reused will be described with reference to FIG. 5.

Initially, the machine configuration reception unit 11 presents a machine configuration setting screen to the user and receives settings of the machine configuration from the user (step S11). Upon reception of the settings of the machine configuration from the user, the axis configuration conversion unit 16 searches for a machine configuration identical or similar to the machine configuration set up by the user (step S12).

In case where any identical or similar machine configuration does not exist in the machine configuration storage unit 13 in step S12 (step S13; result 1), the axis configuration conversion unit 16 passes the process to the default parameter setting unit 18. The default parameter setting unit 18 reads out the default parameters from the default parameter storage unit 17 based on the machine configuration parameters set up by the user and sets up the default parameters for all the axes (step S14).

In case where the machine configuration identical to the machine configuration set up by the user exists in the machine configuration storage unit 13 (step S13; result 2), the axis configuration conversion unit 16 reads out the adjusted parameters having the machine configuration identical to the machine configuration set up by the user, from the adjusted parameter storage unit 15 (step S15). The adjusted parameters readout have the machine configuration identical to the machine configuration set up by the user in step S11 and thus, even without converting the axis, parameters for the axis have been already adjusted.

In case where any machine configuration similar to the machine configuration set up by the user exists in the machine configuration storage unit 13 (step S13; result 3), the axis configuration conversion unit 16 reads out the adjusted parameters having the machine configuration similar to the machine configuration set up by the user in step S11, from the machine configuration storage unit 13 (step S16) and makes a comparison between the axis configuration of the machine configuration set up by the user and the axis configuration of the machine configuration setup in the past (step S17). The axis configuration conversion unit 16 carries out the movement or copying of the axes, the conversion of the inter-axis relations, or the like based on a difference between the axis configuration of the machine configuration set up by the user and the axis configurations set up in the past and converts the adjusted parameters read out in step S16 into the axis configuration of the machine configuration set up by the user.

Figure 6:
FIG. 6 is a diagram illustrating an example of machine configuration parameters before and after the conversion of the axis configuration.

Operation of the axis configuration conversion unit 16 will be described referring to a machine configuration of FIG. 6 as an example. A left side of FIG. 6 represents data of the machine configuration set up in the past and a right side of FIG. 6 represents data of the machine configuration newly set up by the user. In the machine configuration set up in the past, X axis, Y axis, Z axis, and C axis are respectively set as the first axis, the second axis, the third axis, and the fourth axis. In the machine configuration newly set up, A axis has been added as the fourth axis to the machine configuration set up in the past and C axis set up in the past has been moved to the fifth axis. That is the movement and addition of the axes carried out.

Figure 7:
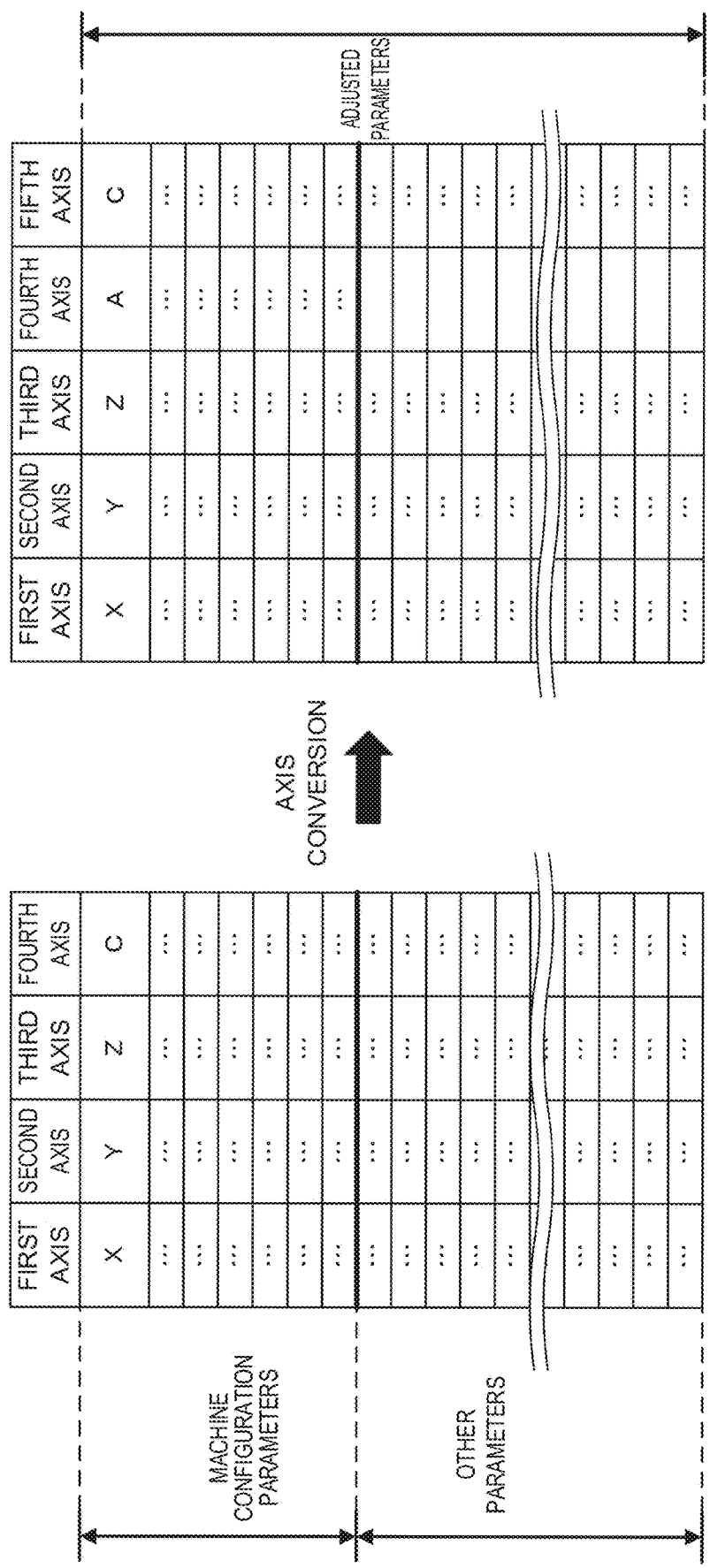
FIG. 7 is a diagram illustrating change in the parameters before and after the conversion of the axis configuration.

In case where the similar machine configuration exists in the machine configuration storage unit 13, the axis configuration conversion unit 16 reads out the adjusted parameters including the machine configuration parameters set up in the past, from the adjusted parameter storage unit 15. The adjusted parameters are composed of the machine configuration parameters and the other parameters, as illustrated in FIG. 7. The other parameters are the adjusted parameters adjusted on the actual machine tool or the simulator.

In case where movement of any axis is carried out, the axis configuration conversion unit 16 copies the parameters of a source axis into the parameters of a destination axis. Further, the inter-axis relations is adjusted in accordance with the movement, addition, or the like of the axis.

The parameters that relates to specialized interpolation among axis, synchronous control among axis, and the like need to adjustment of inter-axis relations. The specialized interpolation among the axes includes interpolation with conversion from a rectangular coordinate system into a polar coordinate system, interpolation for correction from a rectangular coordinate system on a program to an actual moving coordinate system, and the like, for instance. The synchronous control includes relation between axes of master and slave, and the like. In an example of FIG. 6 in which the adjusted parameters for the fourth axis are copied into the fifth axis and the movement of axis from the fourth axis to the fifth axis is carried out. In FIG. 6, item 3 for the first axis includes "FORTH AXIS". That means the item 3 has inter-axis relations. Since the fourth axis moved to the fifth, the conversion of the axis relation must be made. The inter-axis relations is adjusted by rewrite of a value "FOURTH AXIS" in the setting item 3 for the first axis into "FIFTH AXIS".

Once the axis configuration conversion unit 16 carries out the movement or copying of the axes or the conversion of the inter-axis relations for the adjusted parameters, the adjusted parameters on a left side of FIG. 7 are converted into the machine configuration as illustrated on a right side of FIG. 7. In the first to third axes and the fifth axis are the axes, parameters are set up in the past and therefore the adjusted parameters for the axes are copied. The fourth axis, however, is the axis newly set up and therefore the adjusted parameters set up in the past cannot be reused for the axis. Accordingly, the parameters other than the machine configuration parameters are made blank.

In case where any new axis has been added, in this manner, the parameters other than the machine configuration parameters for the axis are made blank (fourth axis in the example of FIG. 7). In a state in which the parameters other than the machine configuration parameters are blank, the machine does not work. Therefore, the default parameter setting unit 18 reads out the parameters from the default parameter storage unit 17 based on the machine configuration set up by the user and sets up the default parameters as the parameters for the axis newly set up.

The default parameter setting unit 18 reads out the default parameters for the newly added axis from the default parameter storage unit 17 based on the machine configuration set up in step S11 and sets up the default parameters (step S18). Thus the parameters for which the existing adjusted parameters are reused are generated.

The parameters generated in step S14, step S15, and step S18 are transferred by the parameter transfer unit 19 to an external numerical controller, another personal computer, a portable storage medium, or the like. The generated parameters may be stored in the ROM 112 of the personal computer 100.

With reference to FIG. 8, subsequently a personal computer 100*a* according to another embodiment of the present disclosure will be described. The personal computer 100*a* is provided with a machine configuration analysis unit 20. The machine configuration analysis unit 20 analyzes the machine configuration of the adjusted parameters. The machine configuration may be analyzed based on axis numbers (first axis, second axis, or the like) on a numerical controller, axis names (X axis, Y axis, or the like) of axes, identification information on motors mounted on the axes, or the like. The machine configuration is included in the adjusted parameters. The machine configuration analysis unit 20 analyzes the axis configuration as to which axis of a machine tool has been set as a particular axis for the numerical controller, what motor has been set for each axis, and whether there is the inter-axis relations, based on data set up in the adjusted parameters.

FIG. 9 is a flowchart shows an operation of the personal computer 100*a* including the machine configuration analysis unit 20. Once the adjusted parameter acquisition unit 14 acquires the adjusted parameters from the numerical controller or the simulator (step S21), the machine configuration analysis unit 20 analyzes the machine configuration of the adjusted parameters based on values of the adjusted parameters (step S22). The parameters to be used for analysis of the machine configuration include the axis numbers, the axis names, the identification information on the motors, the identification information on the machine tool, and the inter-axis relations that have been described, and the like.

Results of the analysis in the machine configuration analysis unit 20 are stored in the machine configuration storage unit 13 (step S23). The machine configuration stored in the machine configuration storage unit 13 may be used as history information on the machine configuration. The machine configuration analyzed in the machine configuration analysis unit 20 may be used temporarily for the axis configuration conversion without being stored in the machine configuration storage unit 13.

The personal computer 100 according to the present disclosure uses the existing adjusted parameters and reduces a burden on the user concerning the adjustment of the parameters. In case where an axis is newly added, furthermore, the default parameters are set up so that minimally required parameters for the operation of the machine tool may be ensured.

The personal computer 100*a* according to the present disclosure analyzes the machine configuration of the adjusted parameters acquired from the externals such as the numerical controller or the simulator, thereby facilitates the comparison between the machine configuration set up by the user and the machine configuration of the adjusted parameters and the conversion of the axis configuration of the adjusted parameters. The analysis serves for efficient use of the adjusted parameters.

The invention claimed is:

1. A parameter setting device for a target machine tool having a plurality of axes, the parameter setting device comprising:
   a processor configured to
      receive settings of a machine configuration of the target machine tool which includes an axis configuration of the plurality of axes,
      acquire adjusted parameters whose values have been adjusted to a pre-existing machine tool, the adjusted parameters corresponding to a plurality of axes in an axis configuration of the pre-existing machine tool,
      detect a difference between the axis configuration of the target machine tool and the axis configuration of the pre-existing machine tool, and
      convert the axis configuration of the pre-existing machine tool to the target machine tool by resetting one or more values of the adjusted parameters corresponding to each axis of the pre-existing machine tool to one or more values of parameters of a respective axis of the target machine tool, based on the difference between the axis configurations of the target machine tool and the pre-existing machine tool.

2. The parameter setting device according to claim 1, wherein
the processor is configured to, in response to detecting a movement of an axis from the axis configuration of the pre-existing machine tool to the axis configuration of the target machine tool, copy the values of the adjusted parameters corresponding to the moved axis of the pre-existing machine tool to values of respective parameters corresponding to the moved axis of the target machine tool.

3. The parameter setting device according to claim 1, wherein
the processor is configured to, in response to detecting a deletion of an axis in the axis configuration of the pre-existing machine tool from the axis configuration of the target machine tool, delete the values of the adjusted parameters corresponding to the axis to be deleted from the axis configuration of the target machine tool.

4. The parameter setting device according to claim 1, wherein the processor is configured to, in response to detecting (i) a movement of an axis from the axis configuration of the pre-existing machine tool to the axis configuration of the target machine tool and (ii) inter-axis relations between the target machine tool and the pre-existing machine tool, convert the values of the adjusted parameters referring to the moved axis before the movement into values of respective parameters referring to the moved axis after the movement.

5. The parameter setting device according to claim 1, wherein
the processor is configured to, in response to detecting that an added axis of the target machine tool is absent in the pre-existing machine tool, set default values for the parameters corresponding to the added axis of the target machine tool for the axis of the plurality of axes.

6. The parameter setting device according to claim 1, wherein
the processor is configured to search for the axis configuration of the pre-existing machine tool based on the adjusted parameters.

7. The parameter setting device according to claim 1, further comprising:
a memory storing the adjusted parameters, wherein
the processor is configured to search, in the memory, for the adjusted parameters having a machine configuration identical or similar to the machine configuration in the received settings.

8. The parameter setting device according to claim 1, wherein
the machine configuration includes identification information on the target machine tool, identification information on motors mounted on the plurality of axes, and types of the plurality of axes.

9. A parameter setting system for a first machine tool having a plurality of axes, the parameter setting system comprising:
a machine configuration reception unit configured to receive settings of a machine configuration of the first machine tool which includes an axis configuration of the plurality of axes;
an adjusted parameter acquisition unit configured to acquire adjusted parameters whose values have been adjusted to a second machine tool, the adjusted parameters corresponding to a plurality of axes in an axis configuration of the second machine tool; and
an axis configuration conversion unit configured to
detect a difference between the axis configuration of the first machine tool and the axis configuration of the second machine tool, and
convert the axis configuration of the second machine tool to the first machine tool by resetting one or more values of the adjusted parameters corresponding to each axis of the second machine tool to one or more values of parameters of a respective axis of the first machine tool, based on the difference between the axis configurations of the first machine tool and the second machine tool.

10. The parameter setting system according to claim 9, wherein
the machine configuration includes identification information on the first machine tool, identification information on motors mounted on the plurality of axes, and types of the plurality of axes.

11. A parameter setting method for a first machine tool having a plurality of axes, the parameter setting method comprising:
receiving settings of a machine configuration of the first machine tool which includes an axis configuration of the plurality of axes;
acquiring adjusted parameters whose values have been adjusted to a second machine tool, the adjusted parameters corresponding to a plurality of axes in an axis configuration of the second machine tool;
detecting a difference between the axis configuration of the first machine tool and the axis configuration of the second machine tool; and
converting the axis configuration of the second machine tool to the first machine tool by resetting one or more values of the adjusted parameters corresponding to each axis of the second machine tool to one or more values of parameters of a respective axis of the first machine tool, based on the difference between the axis configurations of the first machine tool and the second machine tool.

12. The parameter setting method according to claim 11, wherein
the machine configuration includes identification information on the first machine tool, identification information on motors mounted on the plurality of axes, and types of the plurality of axes.

\* \* \* \* \*